US007408918B1

(12) United States Patent
Ramalho

(10) Patent No.: US 7,408,918 B1
(45) Date of Patent: Aug. 5, 2008

(54) METHODS AND APPARATUS FOR LOSSLESS COMPRESSION OF DELAY SENSITIVE SIGNALS

(75) Inventor: Michael A. Ramalho, Wall Township, NJ (US)

(73) Assignee: Cisco Technology, Inc., San Jose, CA (US)

( * ) Notice: Subject to any disclaimer, the term of this patent is extended or adjusted under 35 U.S.C. 154(b) by 1033 days.

(21) Appl. No.: 10/268,345

(22) Filed: Oct. 7, 2002

(51) Int. Cl.
*H04L 12/28* (2006.01)
*G10L 19/00* (2006.01)
*G10L 21/00* (2006.01)

(52) U.S. Cl. ........................................ 370/351; 704/230

(58) Field of Classification Search ................. 704/200, 704/201, 211, 212, 230; 341/126, 155, 200; 370/351, 389, 474; 375/242
See application file for complete search history.

(56) References Cited

U.S. PATENT DOCUMENTS 6,263,111 B1 * 7/2001 Matoba et al. .............. 382/232
6,480,550 B1 * 11/2002 Zimmermann .............. 375/242
6,970,479 B2 * 11/2005 Abrahamsson et al. ....... 370/477
6,975,732 B2 * 12/2005 Nishiguchi et al. ............ 381/74
7,009,935 B2 * 3/2006 Abrahamsson et al. ....... 370/228
2003/0063569 A1 * 4/2003 Kalliokulju et al. .......... 370/252
2003/0202641 A1 * 10/2003 Huang ...................... 379/88.13

OTHER PUBLICATIONS

Hans, Mat, et al., "Lossless Compression of Digital Audio," IEEE Signal Processing Magazine, Jul. 2001, pp. 21-32.

. . . , "General Aspects of Digital Transmission Systems—Terminal Equipments: Pulse Code Modulation (PCM) of Voice Frequencies G.711," International Telecommunications Union, 1988, 1993, pp. 1-10.

* cited by examiner

*Primary Examiner*—Hassan Kizou
*Assistant Examiner*—Betty Lee
(74) *Attorney, Agent, or Firm*—Weaver Austin Villeneuve & Sampson LLP

(57) ABSTRACT

Methods and apparatus are provided for compressing delay sensitive signals. Frames including multiple samples of the delay sensitive signal are analyzed to determine characteristics associated with the frames, such as the range of quantization levels represented by the samples of the frames. The delay sensitive signal is then compressed by providing an anchor point is sent along with information for determining the variation of each sample from the anchor point.

30 Claims, 12 Drawing Sheets

Figure 3

| 301<br>Segment Number | 303<br>Anchor Segment Binary Code {A4 A3 A2 A1} | 305<br>One bit $B_j$ index {C1} for $S_{NEG,j} = -1$ | 307<br>Two bit $B_j$ index {C2 C1} for $S_{NEG,j} = -2$ | 309<br>Two bit $B_j$ index {C2 C1} for $S_{NEG,j} = -1$ | 311<br>Three bit $B_j$ index {C3 C2 C1} for $S_{NEG,j} = -4$ | 313<br>Four bit $B_j$ index {C4 C3 C2 C1} for $S_{NEG,j} = -8$ |
|---|---|---|---|---|---|---|
| +8 | 1111 | | | | | 1111 |
| +7 | 1110 | | | | | 1110 |
| +6 | 1101 | | | | | 1101 |
| +5 | 1100 | | | | | 1100 |
| +4 | 1011 | | | | 111 | 1011 |
| +3 | 1010 | | | 11 | 110 | 1010 |
| +2 | 1001 | | 11 | 10 | 101 | 1001 |
| +1 | 1000 | 1 | 10 | 01 | 100 | 1000 |
| -1 | 0111 | 0 | 01 | 00 | 011 | 0111 |
| -2 | 0110 | | 00 | | 010 | 0110 |
| -3 | 0101 | | | | 001 | 0101 |
| -4 | 0100 | | | | 000 | 0100 |
| -5 | 0011 | | | | | 0011 |
| -6 | 0010 | | | | | 0010 |
| -7 | 0001 | | | | | 0001 |
| -8 | 0000 | | | | | 0000 |

Figure 6A

| 0-255 Linear Quantization Codepoint (601) | μ-law encoding (603) | A-law encoding (before bit inversion) (605) | Anchor codepoint (value) (607) | Example 1 $Y_{POS}$ = q(130) $Y_{NEG}$ = q(126) (608) | Example 2 $Y_{POS}$ = q(130) $Y_{NEG}$ = q(124) (609) | Example 3 $Y_{POS}$ = q(136) $Y_{NEG}$ = q(116) (611) |
|---|---|---|---|---|---|---|
| q(255); most pos | 1000 0000 | 1111 1111 | | | | |
| q(254) | 1000 0001 | 1111 1110 | | | | |
| q(253) | 1000 0010 | 1111 1101 | | | | |
| *** | | | | | | |
| q(137) | 1111 0110 | 1000 1001 | | | | |
| q(136) | 1111 0111 | 1000 1000 | | | | 10101 |
| q(135) | 1111 1000 | 1000 0111 | | | | 10100 |
| q(134) | 1111 1001 | 1000 0110 | | | | 10011 |
| q(133) | 1111 1010 | 1000 0101 | | | | 10010 |
| q(132) | 1111 1011 | 1000 0100 | | | | 10001 |
| q(131) | 1111 1100 | 1000 0011 | | | 111 | 10000 |
| q(130) | 1111 1101 | 1000 0010 | | | 110 | 01111 |
| q(129) | 1111 1110 | 1000 0001 | | 11 | 101 | 01110 |
| q(128); $0^+$ lvl | 1111 1111 | 1000 0000 | | 10 | 100 | 01101 |
| q(127); $0^-$ lvl | 0111 1111 | 0000 0000 | 00000 | 01 | 011 | 01100 |
| q(126) | 0111 1110 | 0000 0001 | 00001 | 00 | 010 | 01011 |
| q(125) | 0111 1101 | 0000 0010 | 00010 | | 001 | 01010 |
| q(124) | 0111 1100 | 0000 0011 | 00011 | | 000 | 01001 |
| q(123) | 0111 1011 | 0000 0100 | 00100 | | | 01000 |
| q(122) | 0111 1010 | 0000 0101 | | | | 00111 |
| q(121) | 0111 1001 | 0000 0110 | 00101 | | | 00110 |
| q(120) | 0111 1000 | 0000 0111 | | | | 00101 |
| q(119) | 0111 0111 | 0000 1000 | 00110 | | | 00100 |
| q(118) | 0111 0110 | 0000 1001 | | | | 00011 |
| q(117) | 0111 0101 | 0000 1010 | 00111 | | | 00010 |
| q(116) | 0111 0100 | 0000 1011 | | | | 00001 |
| q(115) | 0111 0011 | 0000 1100 | 01000 | | | 00000 |
| q(114) | 0111 0010 | 0000 1101 | | | | |
| q(113) | 0111 0001 | 0000 1110 | 01001 | | | |
| *** | | | See Fig.6b | | | |
| q(4) | 0000 0100 | 0111 1011 | | | | |
| q(3) | 0000 0011 | 0111 1100 | | | | |
| q(2) | 0000 0010 | 0111 1101 | | | | |
| q(1) | 0000 0001 | 0111 1110 | | | | |
| q(0); most neg | 0000 0000 | 0111 1111 | $B_f$=8 anchor | | | |

Figure 6B 601 607

| 0-255 Linear Quantization Codepoint | Anchor Codepoint {A5,A4,A3,A2,A1} |
|---|---|
| q(127 (0⁻ level) | 00000 |
| q(126) | 00001 |
| q(125) | 00010 |
| q(124) | 00011 |
| q(123) | 00100 |
| q(121) | 00101 |
| q(119) | 00110 |
| q(117) | 00111 |
| q(115) | 01000 |
| q(113) | 01001 |
| q(111) | 01010 |
| q(108) | 01011 |
| q(105) | 01100 |
| q(102) | 01101 |
| q(99) | 01110 |
| q(96) | 01111 |
| q(93) | 10000 |
| q(89) | 10001 |
| q(85) | 10010 |
| q(81) | 10011 |
| q(77) | 10100 |
| q(73) | 10101 |
| q(69) | 10110 |
| q(65) | 10111 |
| q(61) | 11000 |
| q(56) | 11001 |
| q(51) | 11010 |
| q(46) | 11011 |
| q(41) | 11100 |
| q(36) | 11101 |
| q(31) | 11110 |
| q(0); most neg | 11111 |

Figure 6C 621 627

| 0-255 Linear Quantization Codepoint | Anchor Codepoint {A5,A4,A3,A2,A1} |
|---|---|
| q(129) | 00000 = 0 ($B_j \neq 8$) |
| q(128); $0^+$ level | 00001 = 1 ($B_j \neq 8$) |
| q(127); $0^-$ level | 00010 = 2 ($B_j \neq 8$) |
| q(126) | 00011 = 3 ($B_j \neq 8$) |
| q(125) | 00100 = 4 ($B_j \neq 8$) |
| q(124) | 00101 = 5 ($B_j \neq 8$) |
| q(123) | 00110 = 6 ($B_j \neq 8$) |
| q(122) | 00111 = 7 ($B_j \neq 8$) |
| q(121) | 01000 = 8 ($B_j \neq 8$) |
| q(119) | 01001 = 9 ($B_j \neq 8$) |
| q(117) | 01010 = 10 ($B_j \neq 8$) |
| q(115) | 01011 =11 ($B_j \neq 8$) |
| q(113) | 01100 =12 ($B_j \neq 8$) |
| q(111) | 01101 =13 ($B_j \neq 8$) |
| q(108) | 01110 =14 ($B_j \neq 8$) |
| q(105) | 01111 =15 ($B_j \neq 8$) |
| q(102) | 10000 =16 ($B_j \neq 8$) |
| q(99) | 10001 =17 ($B_j \neq 8$) |
| q(96) | 10010 =18 ($B_j \neq 8$) |
| q(92) | 10011 =19 ($B_j \neq 8$) |
| q(88) | 10100 =20 ($B_j \neq 8$) |
| q(84) | 10101 =21 ($B_j \neq 8$) |
| q(80) | 10110 =22 ($B_j \neq 8$) |
| q(75) | 10111 =23 ($B_j \neq 8$) |
| q(70) | 11000 =24 ($B_j \neq 8$) |
| q(65) | 11001 =25 ($B_j \neq 8$) |
| q(60) | 11010 =26 ($B_j \neq 8$) |
| q(54) | 11011 =27 ($B_j \neq 8$) |
| q(48) | 11100 =28 ($B_j \neq 8$) |
| q(41) | 11101 =29 ($B_j \neq 8$) |
| q(36) | 11110 =30($B_j \neq 8$)<br>Special Note: If $B_j$=8 this Anchor codepoint is used to signal an eight bit coding (see next table) |
| *Explicit Anchor* in additional (second) overhead byte | 11111 =31 ($B_j \neq 8$) |
| q(0); most neg | 11110 = 30<br>($B_j$=8, default anchor) |

METHODS AND APPARATUS FOR LOSSLESS COMPRESSION OF DELAY SENSITIVE SIGNALS

BACKGROUND OF THE INVENTION

1. Field of Invention

The present invention relates to compressing data. More specifically, the present invention relates to methods and apparatus for efficiently and effectively compressing signals for transmission on a network such as a cell based or packet based network.

2. Description of the Related Art

Conventional techniques for compressing delay sensitive signals such as telephony or audio signals are limited. Any audio, video, or data sequence specified for transmission with minimal delay is referred to herein as a delay sensitive signal. Examples of delay sensitive signals are real-time video streams and telephony signals. In typical implementations, a delay sensitive signal such as a telephony signal is companded for transmission on a telephony network. A signal that represents an input analog signal is compressed into logarithmic segments, where each logarithmic segment is quantized and coded using uniform quantization. Such a signal is referred to herein as a companded signal. To improve bandwidth efficiency for packet or cell-based transport of normal telephony audio signals, the telephony signals are then often further compressed by the interworking hardware between Public Switched Telephone Networks (PSTN) or General Switched Telephone Networks (GSTN) and transport IP networks.

However, the conventional techniques for compression are typically inadequate, lossy, or inefficient. Consequently, it is desirable to provide improved techniques for compressing data, particularly delay sensitive data, for transmission over a network such as a packet or cell based network.

SUMMARY OF THE INVENTION

Methods and apparatus are provided for compressing delay sensitive signals. Frames including multiple samples of the delay sensitive signal are analyzed to determine characteristics associated with the frames, such as the range of quantization levels represented by the samples in the frames. The delay sensitive signal is then compressed by providing an anchor point that is sent along with information for determining the variation of each sample from the anchor point.

In one embodiment, a method for compressing a delay sensitive signal is provided. A delay sensitive signal is received. The delay sensitive signal includes multiple frames each having samples at multiple quantization levels. A range of quantization levels associated with samples in a frame of the delay sensitive signal is identified. The frame of the delay sensitive signal is compressed into a compressed frame. The compressed frame is associated with a compressed delay sensitive signal. The compressed frame includes information to losslessly retrieve the frame in the delay sensitive signal.

In another embodiment, a network device is provided. The network device includes an interface and a processor. The interface is configured to receive a delay sensitive signal. The delay sensitive signal includes a plurality of frames each having samples at a plurality of quantization levels. The processor is configured to identify a range of quantization levels associated with samples in a frame of the delay sensitive signal and compress the frame of the delay sensitive signal into a compressed frame. The compressed frame is associated with a compressed delay sensitive signal. The compressed frame includes information to losslessly retrieve the frame in the delay sensitive signal.

Other embodiments of the invention pertain to computer program products including machine readable media on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 3 is a diagrammatic representation showing a mapping that can be used for compressing a delay sensitive signal.

FIG. 6ABC are diagrammatic representations showing various mappings that can be used for compressing a delay sensitive signal.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of compressing delay sensitive signals associated with a telephony network. However, it should be noted that the techniques of the present invention are applicable to a variety of different protocols and networks. Further, the solutions afforded by the invention are equally applicable to variations in speech and coding systems. According to various embodiments, the techniques of the present invention allow for the compression of delay sensitive (companded or non-companded) signal encodings with low complexity and virtually no added delay for transmission on networks such as packet or cell based networks.

Figure 1:
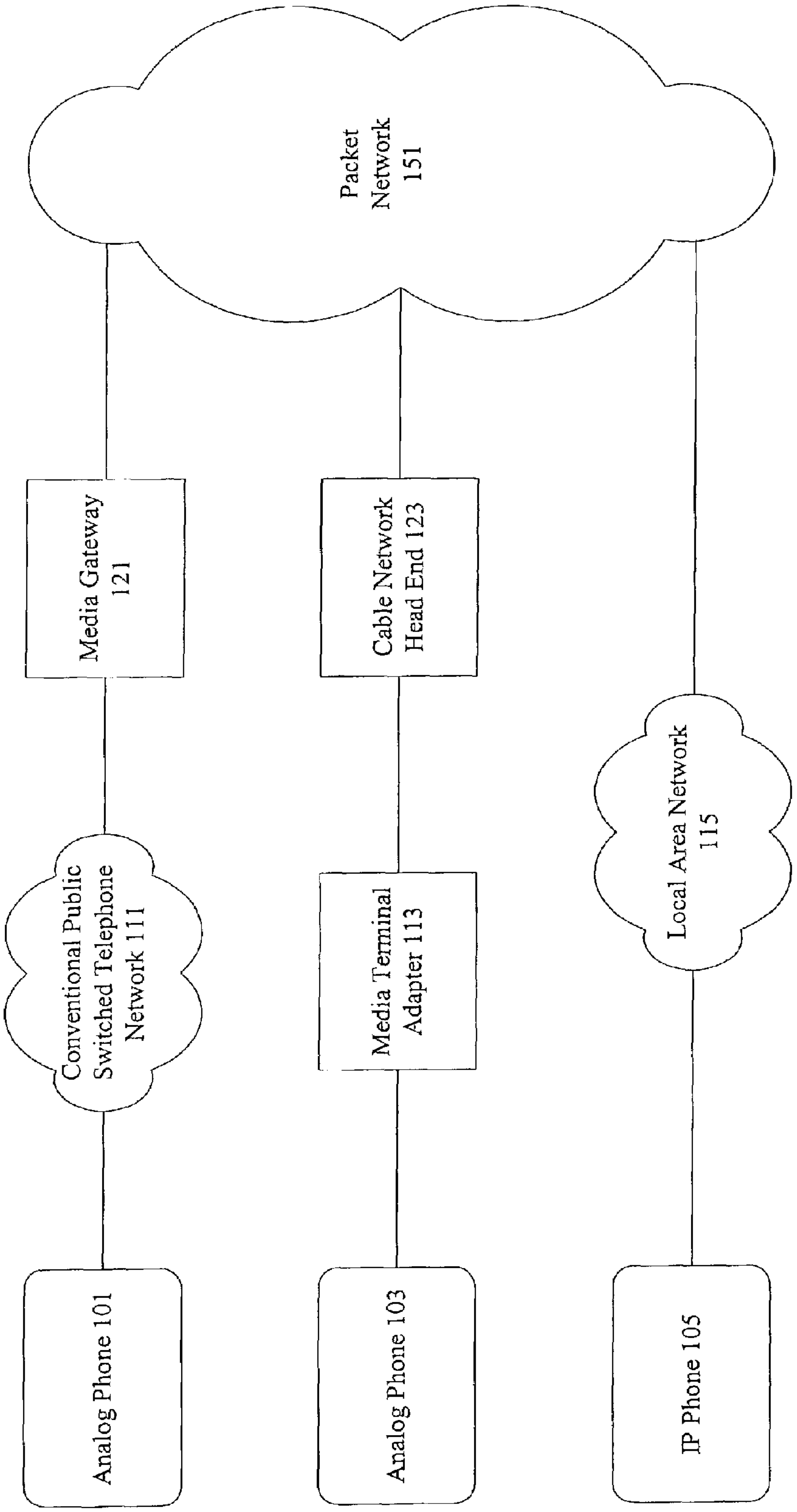
FIG. 1 is a diagrammatic representation of a system that can use the techniques of the present invention.

FIG. 1 is a diagrammatic representation showing various types of interworking hardware that can be used to implement the techniques of the present invention. In one example, an analog phone 101 is connected to a conventional PSTN 111. To allow transmission of the conventional PSTN signals onto a packet network 151, a media gateway 121 is provided. According to various embodiments, the techniques of the present invention for lossless compression of delay sensitive signals are implemented on a media gateway 121. In another example, an analog phone 103 is coupled to a media terminal adapter 113. To allow transmission of G.711 signals to a cable network head end 123, a media terminal adapter 113 can be used to compress G.711 signals losslessly for eventual transmission to packet network 151. In still another example, an IP phone 105 may in itself include functionality for compression of G.711 signals for transmission on a packet based local area network 115 coupled to a packet network 151. The examples of FIG. 1 are not exhaustive. The invention may be used at any location in the network where a transcoding of data into a compressed representation is desirable. It should be noted that other devices and components may be used to allow for transmission.

Typical interworking devices use lossy compression coders often optimized for speech. Some coders used are G.723.1 and G.729A. These coders compress the PSTN/GSTN Pulse Code Modulation (PCM) signals (defined in ITU-T Standard G.711) from 64 kbps to bit rates of 8 kbps or less. Aspects of digital transmission systems such as G.711 and companding are described in ITU-T Recommendation G.711 titled Pulse Code Modulation Of Voice Frequencies, available from the International Telecommunication Union, the entirety of which is incorporated by reference for all purposes.

ITU-T Recommendation G.711 specifies the dominant companding methods used in the PSTN/GSTN—mu-law and A-law companding (with mu=255 and A=87.56). The primary aim of both "mu 255" and "A 78.56" law codecs is to quantize larger signals more coarsely and smaller signals more finely, resulting in a "flatter" SNR over a wider dynamic range while using only 8 bits. For example, the (eight bit) "mu 255" companding coder approximates the signal to noise ratio (SNR) attained by a 13 linear codec for low signal input levels. The tradeoff is less SNR at high signal levels than the equivalent 13 bit linear codec owing to the coarser quantization of larger input signals.

Figure 2:
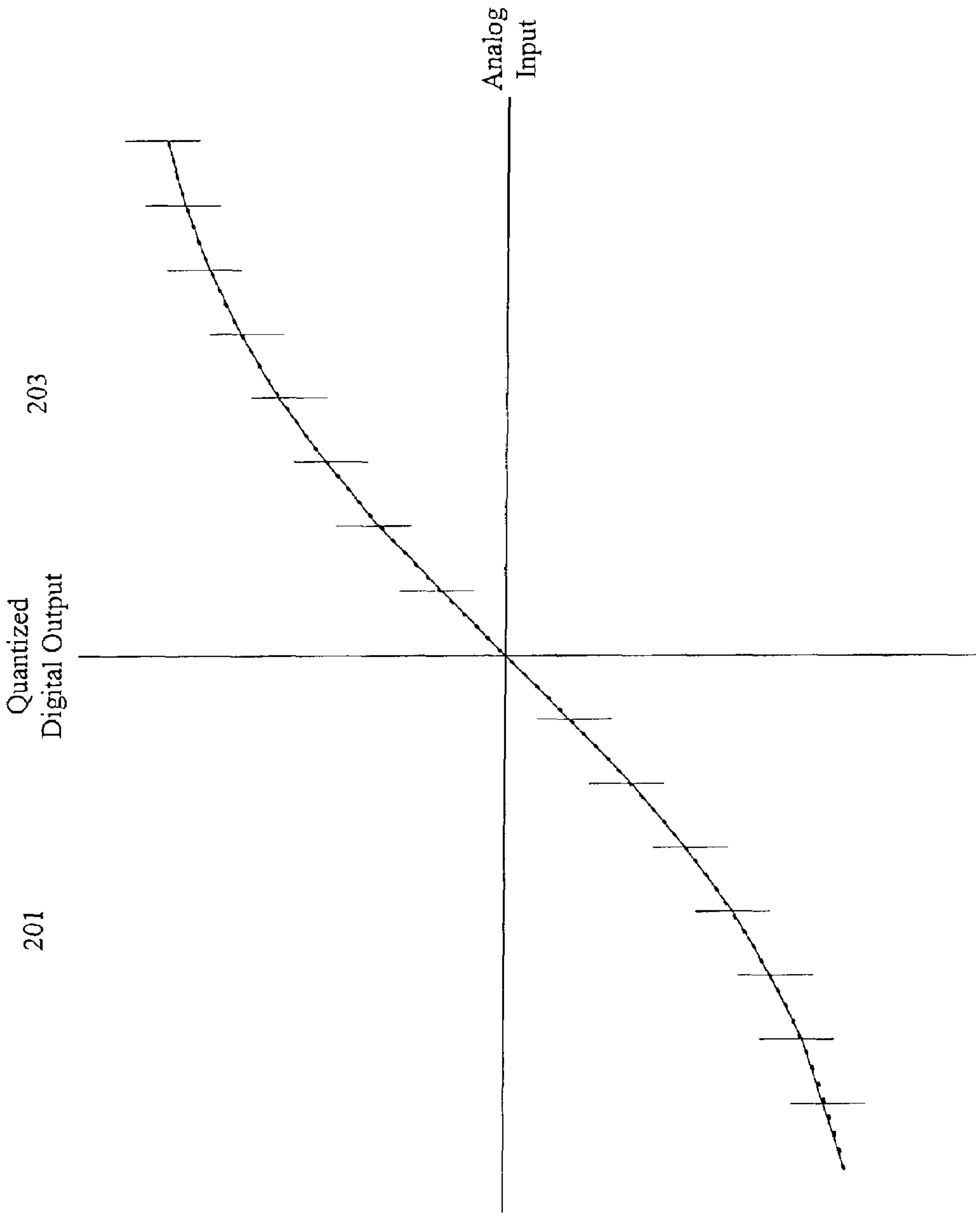
FIG. 2 is a graphical representation showing companding of a signal.

FIG. 2 is a graphical representation showing one example of companding. Portions 201 and 203 show the sixteen linear segments on the either side of zero. The "mu 255" law consists of a 15 segment characteristic with the two innermost segments about zero having the identical slope; the "A 78.56" law has the four innermost segments having the identical slope, resulting in 13 areas of distinct slope. In both cases, the segment information is conveyed by $\log_2(16)=4$ bits. Further, the amplitudes within each segment are qualtized to 16 levels, requiring an additional 4 bits. These eight bits are organized as shown in Table 1:

TABLE 1

| | |
|---|---|
| Bit 1: | Sign (p) |
| Bits 2-4: | Segment number (s) |
| Bits 5-8: | Level within a segment (L) |

As a side note, the G.711 A-law documentation and tables consider the two innermost segments on either side of zero as one "double width" segment. The segment description above is equivalent and many references describe A-law using a sixteen segment description. Bits 1-4 can be used to identify one of 16 possible segments associated with G.711 encoding. Henceforth, bits 1-4 will be referred to as the "segment bits" and will be labeled as H4, H3, H2 and H1 bits, respectively. Likewise, bits 5-8 will be referred to as "bits within a segment" and will be labeled as the L4, L3, L2, and L1 bits, respectively.

The techniques of the present invention recognize the desire and need for lossless transmission of delay sensitive signals such as G.711 signals. Compressing an input signal in a manner that allows retrieval of the same input signal is referred to herein as lossless transmission. In many Voice Over IP (VoIP) applications, voice data is compressed using coders such as G.723.1 and G.729A. However, these coders are lossy. That is, the voice or audio data is filtered and approximated using a model to allow for transmission at rates of 8 kbps. Because conventional coders are optimized for speech, generalized audio is often poorly reproduced when coded and decoded by most speech coders (e.g., music on hold). That is, G.711 companding already introduces distortion and degradation to the input audio signal, as companding is already a form of compression. Further compression using a lossy coder such as G.723.1 or G.729A degrades the audio quality further. In another example, lossy coders such as G.723.1 and G.729A can not be used to transmit voiceband modem signals at the modems' designated maximum rates. Modems typically require the entire 64 kbps G.711 signal to be losslessly transmitted from end-to-end.

According to various embodiments, efficient and lossless compression of input signals for transport over packet networks is provided. The techniques of the present invention recognize several characteristics of typical telephony or audio input signals that allow effective and efficient lossless compression. One characteristic is that the speech/audio coded using G.711 so encoded will typically be zero mean, because the signals are usually based on acoustic signals (which are usually zero mean over any significant observation interval), have been coupled by devices that are only able to transduce acoustic signals to electrical signals in a zero mean sense (ignoring "dc biasing" of such transducers as microphones), and the signals have been high pass filtered (typical PSTN/GSTN cutoffs of around 100 Hz). Furthermore, for all but the lowest amplitude signals, Bits 5-8 (L4, L3, L2 and L1) are expected to be relatively random, resulting in an expected uniform distribution across these bits. This, in turn, lessens the opportunity for effective compression for these "low order" bits.

G.711 PCM signals are grouped into "speech/audio" frames for transport over packet networks. The typical audio frame size currently specified for G.711 VoIP packets is 20 msec, which would result in 160, eight-bit samples or 160 bytes of G.711 coded audio. Typical frame sizes for speech encoders are 10 msec (e.g., G.729), 20 msec (e.g., GSM), and 30 msec (e.g., G.723.1). One can also place more than one speech/audio frame per packet. The following method operates on speech/audio frames independent of their length. Any sequence of samples is referred to herein as a frame.

As will be appreciated, G.711 signals can be grouped as samples of various quantization levels (typically 256) in frames of audio signals. The techniques of the present invention contemplate losslessly compressing G.711 signals by providing an anchor quantization level followed by a sequence representing each sample's variation from the anchor quantization level. Any reference quantization level is referred to herein as an anchor or an anchor codepoint. According to various embodiments, the number of bits needed to represent the variation of each sample variation from the anchor is also provided.

Lossless Compression Via Remapping of Segment Information

FIG. 3 is a diagrammatic representation showing one example of mapping for compressing signals. In one embodiment, anchors lie at each segment, where each segment includes 16 quantization levels. The bits representing the segments (H4, H3, H2, H1) are mapped onto a smaller number of bits if possible and the bits representing the quantization levels within a segment (L4, L3, L2, L1) are transmitted as is. Column 301 shows the sixteen segment numbers (labeled from +8 to −8) and column 303 shows the codes representing each of the possible anchors associated with the segment numbers. For example, if all of the samples in a frame lie within segment +1 and segment −1 as represented by codes 1000 and 0111, the codes 1000 and 0111 can be replaced by a single bit set to either 1 or 0 as shown in column 305. Thus, the number of bits $B_j$ needed to represent a span of S segments in sample frame j is ceiling($\log_2 S$), where ceiling is the integer ceiling function and $\log_2$ is log base 2. For example, to represent S=4 segments, $B_j$=2 bits are needed. To represent S=5 segments, $B_j$=3 bits are needed. Information for determining an anchor as well as the variation of each sample from an anchor is referred to herein as side information.

The following describes the one byte side information encoding which contains a coding for the number of bits needed to represent the samples in a frame relative to an anchor position. The anchor bits will be labeled A4, A3, A2, A1 and will appear in the coding right justified. The frame index is represented by j. The sample index within a frame is represented by i.

The number of $B_j$ bits needed to code the segment span will be denoted N2, N1 and encoded via Table 2:

TABLE 2

| Number of $B_j$ bits used | N2 | N1 |
|---|---|---|
| One bit | 0 | 0 |
| Two Bits | 0 | 1 |
| Three Bits | 1 | 0 |
| Four Bits | 1 | 1 |

Bits R1 and R2 are reserved bits and can be used for other purposes but are illustrated in the following examples as being set to zero. The first byte of an encoded frame is the side information, encoded as: {R2 R1 N2 N1 A4 A3 A2 A1}. For example, a two bit per sample segment encoding anchored at segment −1 would be encoded {0 0 0 1 0 1 1 1}, as shown in columns 303 and 309.

Figure 4:
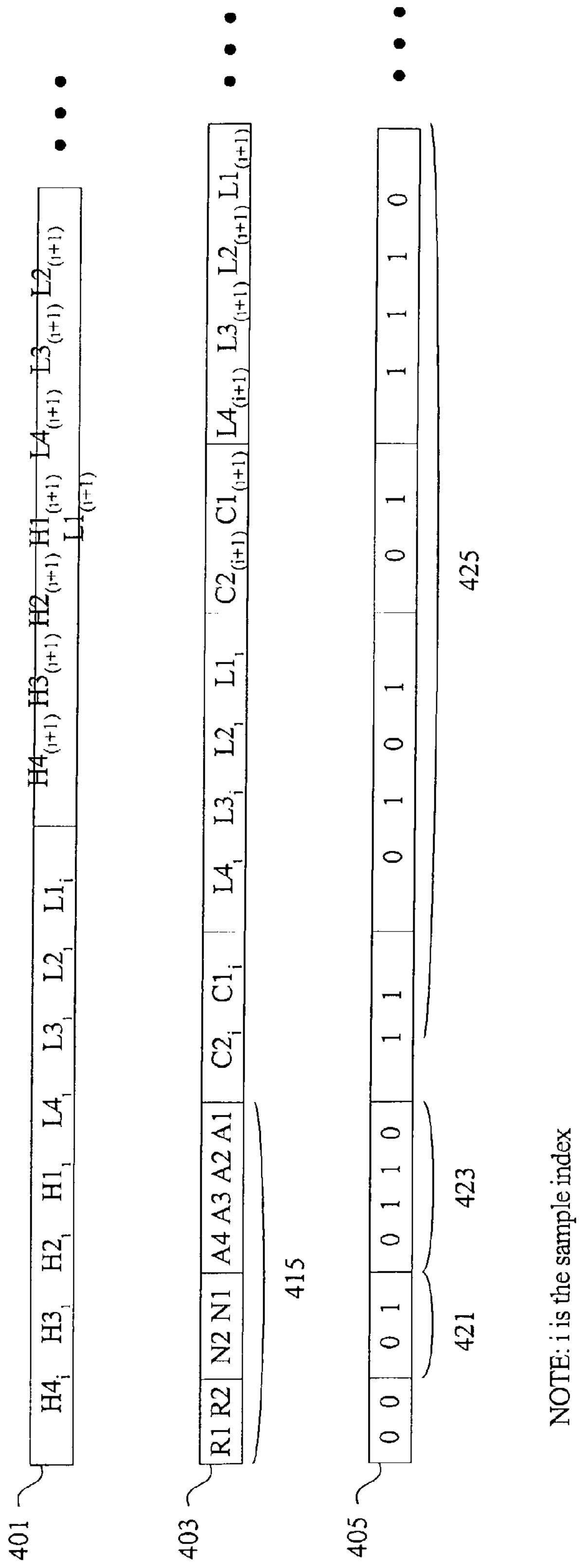
FIG. 4 is a diagrammatic representation showing a compressed delay sensitive signal.

FIG. 4 is a diagrammatic representation showing an example of a compressed delay sensitive frame where the segments are mapped using 2 bits. The contiguous quantization levels spanning from substantially the maximum quantization level in a frame to substantially the minimum quantization level in a frame is referred to herein as the range of quantization levels. The number of segments levels spanned by this range of quantization levels is S. Each sample in a frame is encoded and sent by concatenating the appropriate number of $B_j$ bits needed to represent the mapping of the S segments spanned (see Table 2 above), with the four L bits (i.e. quantization level within a segment bits are sent unmodified). The segment bits are labeled {C4, C3, C2, C1} if $B_j$=4, {C3, C2, C1} if $B_j$=3, {C2, C1} if $B_j$=2, or {C1} if $B_j$=1. The bits within a segment are denoted L4, L3, L2, L1, with L1 being the least significant bit. The subsequent samples are coded similarly and each is concatenated with the previously coded sample, as shown by the example below.

In one example, a frame 401 includes multiple samples each represented as H4, H3, H2, H1, L4, L3, L2, L1. The samples are mapped onto a format shown in frame 403. Side information byte 415 includes reserved bits R1 and R2, bits N1 and N2 indicating the number of Bj bits needed to encode the segment information and anchor bits A4-A1. In one example, the entire range of quantization levels in a frame lie within segment numbers −2 and +2, which are represented by anchor segment binary code in 303 to be 0110, 0111, 1000, and 1001. Since a four segment span can be represented by a two bit code ($B_j$=2), Table 2 is referenced to identify the code 01 for the N1 and N2 bits 421. The anchor 423 is set to 0110. The samples 425 in the frame are transmitted using the abbreviated code to represent the segments numbers. That is, 00, 01, 10, and 11 are used to represent the segment numbers 0110, 0111, 1000, and 1001, respectively. The L bits are transmitted as is. In this example, six bits (2 Bj bits and 4 L bits) per sample are used to represent the 8 bit G.711 samples. The sample mapping allows lossless compression with very little complexity or processing overhead.

Figure 5:
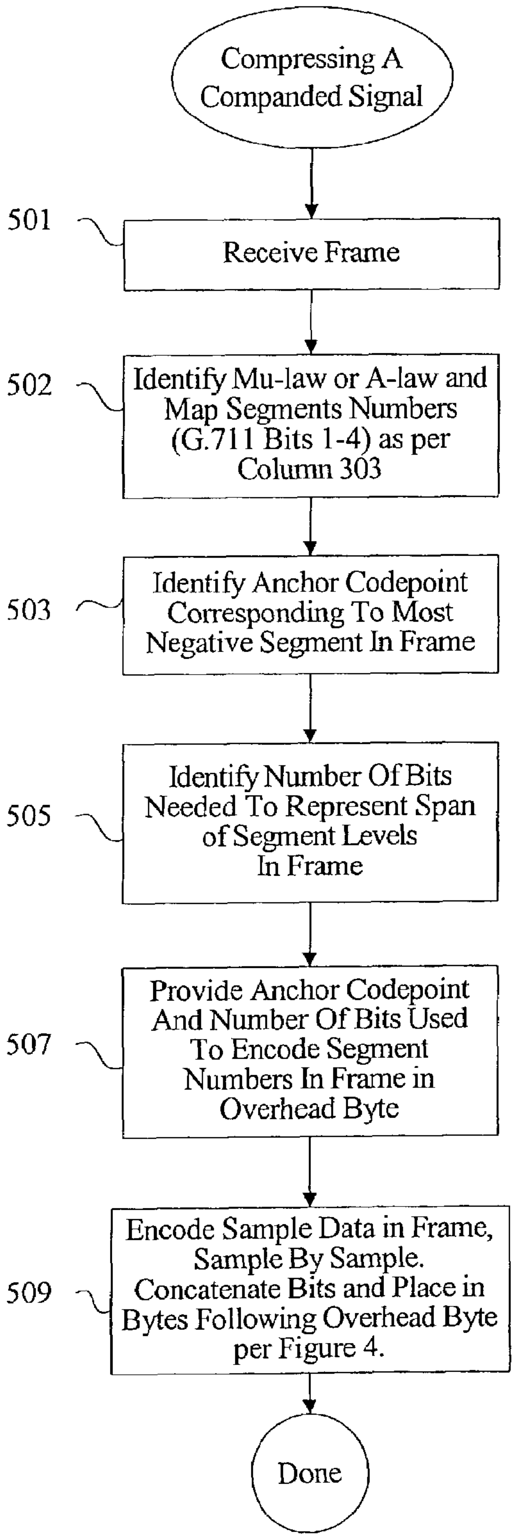
FIG. 5 is a flow process diagram illustrating the technique for compressing a delay sensitive signal.

FIG. 5 is a process flow diagram showing mapping using segment numbers. At 501, a frame is received. At 502, A-law or mu-law quantization is identified and the segment numbers (represented by the H bits) are mapped to −8 and +8 numbers as noted in FIG. 3. At 503, the most negative segment is identified as the anchor. At 505, the number of bits needed to represent the span of segments needed, i.e. the number of different segment numbers, is identified. At 507, the anchor codepoint and the number of Bj bits used to represent the segment span S (the N bits) are provided as side information. In one embodiment, the side information is a single byte. At 509, mapped data is provided. In one example, L bits are provided as is.

This invention assumes a lossless decoding and therefore a decoder function occurs at the place where the lossless mapping to the original G711 signal is desired. It is obvious to someone skilled in the art that a decoder should be able to reconstruct the original G711 bits (H4, H3, H2, H1, L4, L3, L2, L1) for each sample with knowledge of the mapping used at the encoder, the length of the frame in samples and the information contained in the side information.

Lossless Compression Via Remapping of Entire Sample Space (Basic Technique)

A variety of different mappings can be used. FIGS. 6A and 6B are a diagrammatic representations showing an alternative mapping that compresses the entire 256 sample range independent of segment boundaries. In this mapping, the entire 256 level quantization range (H4, H3, H2, H1, L4, L3, L2, L1) are first mapped to an intermediate code whereby 0 corresponds to the most negative quantization value and 255 to the most positive value in 601. As in the previous example, side information is fitted into a single byte, although mapping using multiple bytes as side information are also contemplated. In one example, anchors are located on the most negative value, so the anchoring points need only be specified to reside in the negative portion of the codespace as shown in FIG. 6A.

In one implementation, five bits in an 8 bit side information byte are used to represent anchor points and three bits in the 8 bit side information byte are used to represent how many bits per sample are required for the encoding. Five bits allow for the specification of $2^5$=32 anchor locations. In one embodiment, a close to optimum strategy of logarithmically spaced codepoints from the analog zero level throughout the negative quantization levels is used (see columns 601 and 607 in FIG. 6A). According to various embodiments, an anchor for the frame refers to the anchor codepoint closest to but not more positive than the most negative quantization level in the frame. The range of quantization levels to be mapped for the frame by this method is the number of quantization levels from the anchor codepoint to the most positive quantization level in the frame.

Column 601 shows the quantization levels ranging from 0 to 255. Columns 603 and 605 show the corresponding mu-law or A-law encoding for the quantization levels shown in the figure. Column 607 shows some 5 bit anchor codepoints mapped to approximately 32 different quantization levels. A full set of 32 anchor codepoints are shown in FIG. 6B. The anchor bits will be labeled A5, A4, A3, A2, A1 and will appear in the coding right justified. The number of bits needed to represent the range of quantization levels to be mapped for the frame are encoded as shown in Table 3:

TABLE 3

| Number of bits used | N3 | N2 | N1 |
|---|---|---|---|
| One bit | 0 | 0 | 0 |
| Two Bits | 0 | 0 | 1 |
| Three Bits | 0 | 1 | 0 |
| Four Bits | 0 | 1 | 1 |
| Five Bits | 1 | 0 | 0 |
| Six Bits | 1 | 0 | 1 |
| Seven Bits | 1 | 1 | 0 |
| Eight Bits | 1 | 1 | 1 |

Figure 7:
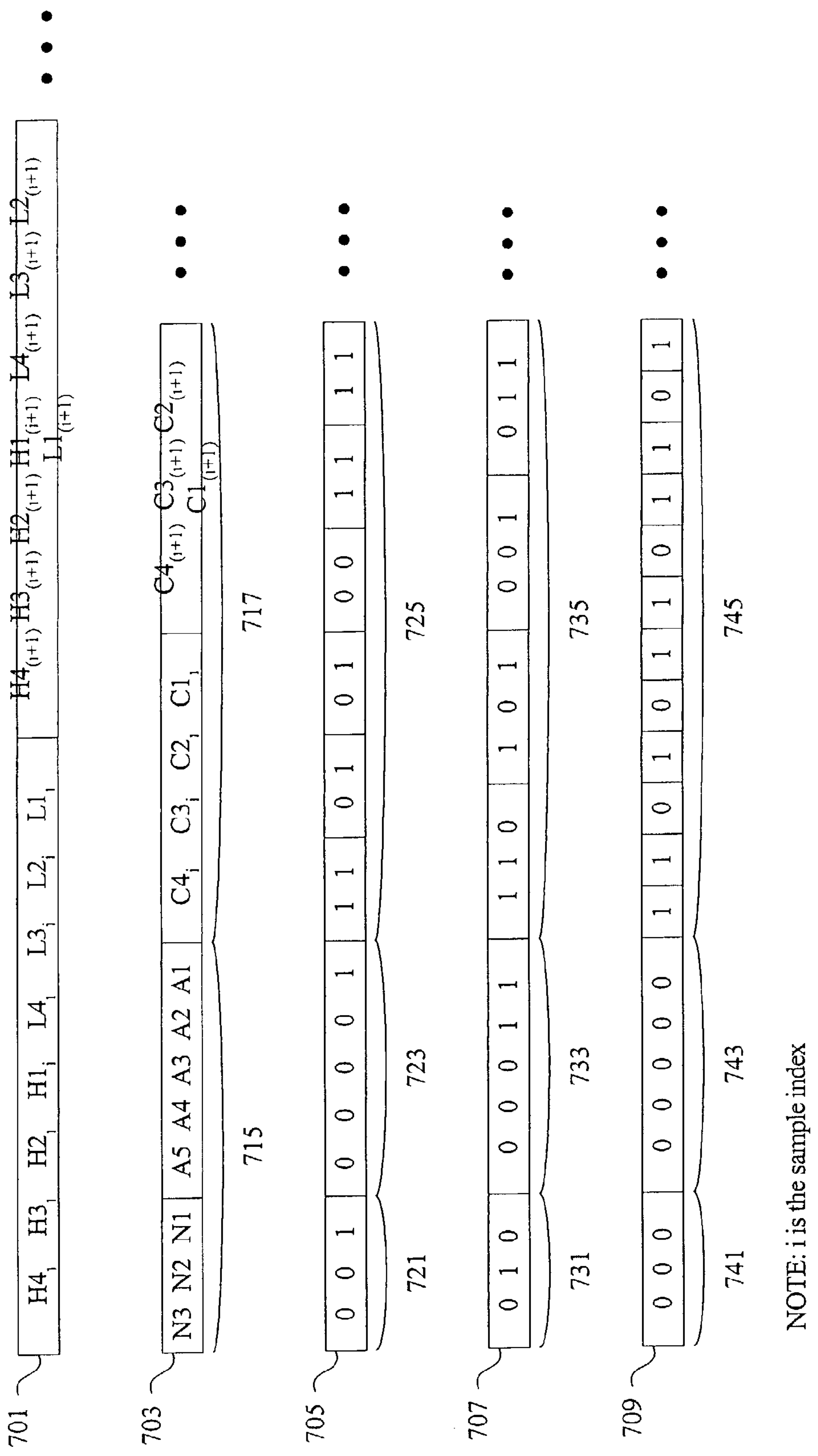
FIG. 7 is a diagrammatic representation showing a compressed delay sensitive signal.

FIG. 7 is a diagrammatic representation showing examples of frames mapped using approximately 32 anchors. In one embodiment, the first byte of an encoded frame is the side information, encoded as: {N3,N2,N1,A5,A4,A3,A2,A1} as shown in Frame 703. Side information byte 715 would include anchor information A5-A1 and the number of bits needed to code the range of quantization levels N3-N1. 703 shows a 4 bit per sample example, with the first two samples in the frame are depicted in 717.

In one example (Column 608), all samples in a frame lie in 4 quantization levels between quantization level 126 (q(126)) and quantization level 129 (q(129)). Anchor codepoint 00001 would be selected from FIG. 6A as the anchor and the number of bits per sample would be two to represent four possible quantization levels. In frame 705, two bits are needed to code a range of four possible quantization levels. Thus the N bits are set to 001 in 721 and the A bits are set to 00001 in 723 The payload G.711 data is transmitted as two bit sequences per sample in the sample bits shown in 725. Thus in this example, 00, 01, 11, and 11 are used to represent the quantization levels of q(126), q(127), q(128), and q(129), respectively.

Frame 707 shows an example for a frame that has a signal span of 8 levels, from quantization level q(124) to quantization level q(131) (column 609). An anchor point of 00011 representing quantization level 124 is shown in 733. The number of bits needed to represent the range of quantization levels is 3 to show eight possible quantization levels. Thus, the N bits are set to 010 in 731. In this example, 000, 001, 010, 011, 100, 101, 110 and 111 would represent quantization levels q(124), q(125), q(126), q(127), q(128), q(129), q(130), and q(131), respectively in samples 735.

Similarly, frame 709 represents a frame in which only two quantization levels appear, quantization levels q(127) and q(128). The N bits are 000 in 741, the A bits are 00000 and q(127) and q(128) are represented in samples 745 as 0 and 1, respectively.

Figure 8:
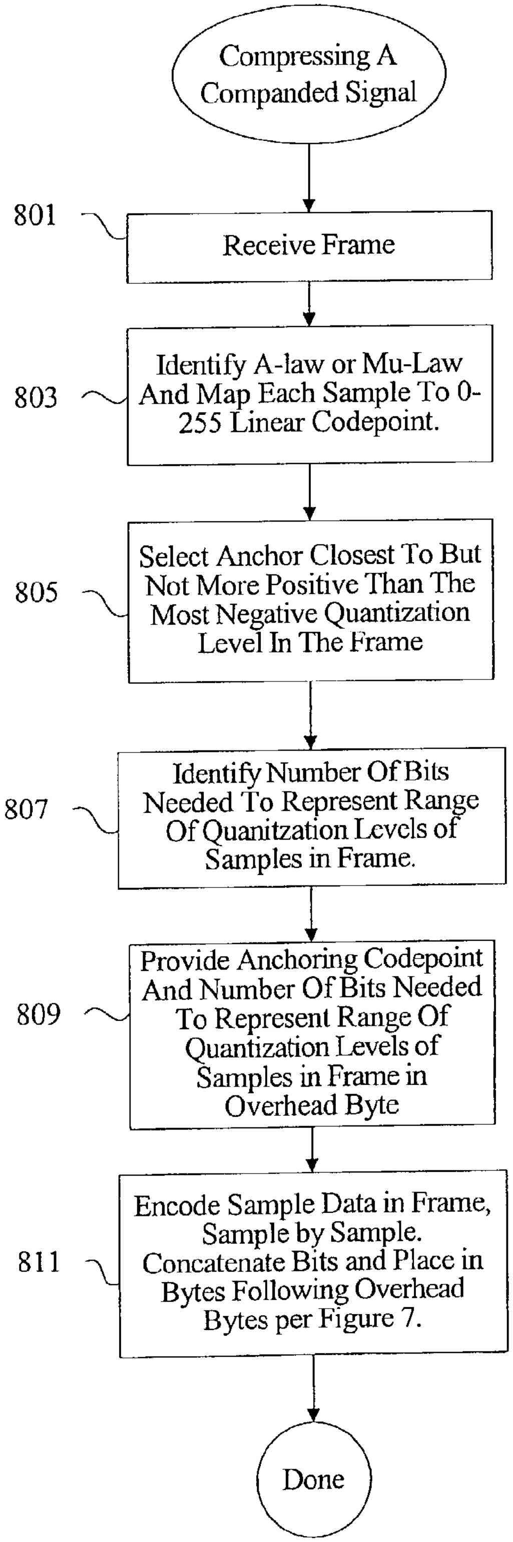
FIG. 8 is a flow process diagram showing a technique for compressing a delay sensitive signal.

FIG. 8 is a flow process diagram showing a technique for mapping samples in a frame. At 801, a frame is received. At 803, the A-law or mu-law quantization codepoints are mapped to the linear 0-255 codepoints (column 601). At 805, the anchor closest to but not more positive than the most negative quantization level in the frame is set as the anchor for the frame. At 807, the number of bits needed to represent the range of quantization levels in the frame that need to be mapped is identified. At 809, the anchoring codepoint and the number of bits needed to represent the range of frame samples are provided as side information for the samples in the frame. At 811, each sample is coded using the number of bits identified at 807 by means of a binary count up from the anchor. The bits are then concatenated as noted above.

This invention assumes a lossless decoding and therefore a decoder function occurs at the place where the lossless mapping to the original G711 signal is desired. It is obvious to someone skilled in the art that a decoder should be able to reconstruct the original G711 bits (H4, H3, H2, H1, L4, L3, L2, L1) for each sample with knowledge of the mapping used at the encoder, the length of the frame in samples and the information contained in the side information.

Lossless Compression Via Remapping of Entire Sample Space (Enhanced Technique)

According to various embodiments, an enhancement has been designed and implemented that improves on coding for the rare case when the lack of an anchor at other than the anchor codepoint locations (the set of 32 anchor points shown in FIGS. 6A and 6B) results in an increase of one bit needed to represent each sample. It should be noted that since the anchor codepoint portion of the overhead (side) information only had only 5 bits, only 32 of the potential 255 locations could be represented. As mentioned previously, a close to optimum strategy of logarithmically spaced codepoints from zero was chosen and this codepoint placement strategy remains. Also as noted above, G.711 mu-law or A-law speech is usually packetized in 10 msec (80 sample) or 20 msec (160 sample) or 30 msec (240 sample) frames. Thus an additional bit per sample yields an additional 80 or 160 or 240 bits per frame owing to the lack of an anchor codepoint at one of the 32 anchor points.

Since all 255 locations can be represented by one byte (8 bits), the anchor can be represented precisely at the cost of additional overhead byte of side information for this case. Samples can be represented in exactly $\log_2(y)$ bits, where y is the range of quantization levels spanned in a given frame. According to various embodiments, by adding another overhead byte, an additional bit per sample can be saved. An anchor that can be used to designate any quantization level is referred to herein as an explicit anchor.

In one implementation, a second byte of side information is used to include the explicit anchor. Information in the first byte can be used to signal that the second byte contains the explicit anchor. According to various embodiments, to signal that a second overhead byte containing an explicit anchor is being used, one of the 32 anchor codepoints can be used to indicate that the explicit anchor is contained in a second overhead byte for this frame. FIG. 6C is a table showing explicit anchor signaling for this enhancement. The mapping is similar to the previous anchor mapping codebook in that the proposed anchors are approximately logarithmically spaced. The first difference is that the anchor codepoint {A5,A4,A3, A2,A1}={11111} denotes that the next byte is the fully specified, 8 bit, explicit anchor (in binary, counting from the most negative quantization level=00000000). A second small difference is that a few codepoints are placed above the O-level to compensate for potentially inaccurate analog A/D encoding bias (small positive DC offset in the analog AID converter front end circuitry). These remaining anchor codepoints are spaced using a methodology similar (i.e., approximately logarithmically) to the mapping shown in FIGS. 6A and 6B.

A slightly modified table for the N bits is used for this enhancement. This enhancement allows for a "zero bit" encoding if the entire G711 frame contains only one value. A modification to the N bit table uses the "0 0 0" N codepoint to signify either a zero bit or an eight bit encoding, depending on the value of the A bits, as shown below in Table 4:

TABLE 4

| Number of Bj bits used | N3 | N2 | N1 |
|---|---|---|---|
| Eight Bits (if A bits = {11110}) | 0 | 0 | 0 |
| Zero bit (if A bits ≠ {11110}) | 0 | 0 | 0 |
| One Bits | 0 | 0 | 1 |
| Two Bits | 0 | 1 | 0 |
| Three Bits | 0 | 1 | 1 |
| Four Bits | 1 | 0 | 0 |
| Five Bits | 1 | 0 | 1 |
| Six Bits | 1 | 1 | 0 |
| Seven Bits | 1 | 1 | 1 |

According to various embodiments, a case may arise where the entire mu-law or A-law frame contains only one value, which is called the "zero bit per sample" case. To signal this case, the table above uses the same N codepoint to signal both the eight bit and zero bit case depending on the value of the A bits. An eight bit encoding is signaled in the overhead byte by using the N={0 0 0} bits and the A={1 1 1 1 0} codeword, effectively borrowing a potential anchoring codepoint (the most negative one) from use in signalling the "zero bit" encoding case. An eight bit encoding in this enhancement is always anchored at q(0), as all 256 possible G.711 values can be represented as an eight bit count from q(0). Note that when a "zero bit" encoding case occurs in a typical embodiment of a mu-law or A-law PCM system, the one value is most likely a value around the "natural zero" of the G711 encoded space (i.e., near the 0+ (q(128)) or 0− level (q(128))). Since there are anchoring codepoints at these levels (there are continuous anchoring codepoints from q(121) through q(129), inclusive), the frame can be compressed to exactly one byte. However, to accommodate all possible artificially generated G711 signals that could have the single level at any quantization level, an explicit anchor is used if an anchoring codepoint is not available at that quantization level. Thus, if, by chance, the single G711 level is q(33) (the anchoring codepoint of {1 1 1 1 0} borrowed to signal an eight bit encoding), the quantization level q(33) is signaled using an explicit anchor.

An atypical case is when less than eight bits may be needed to represent the range of quantization levels but the most negative quantization level in the frame is more negative than the most negative available anchor. However, to represent all possible artificially generated G.711 signals to provide lossless transmission, an explicit anchor can be used to represent the most negative quantization level if the most negative quantization level is below the lowest available anchoring codepoint for zero through seven bit encodings.

Figure 9:
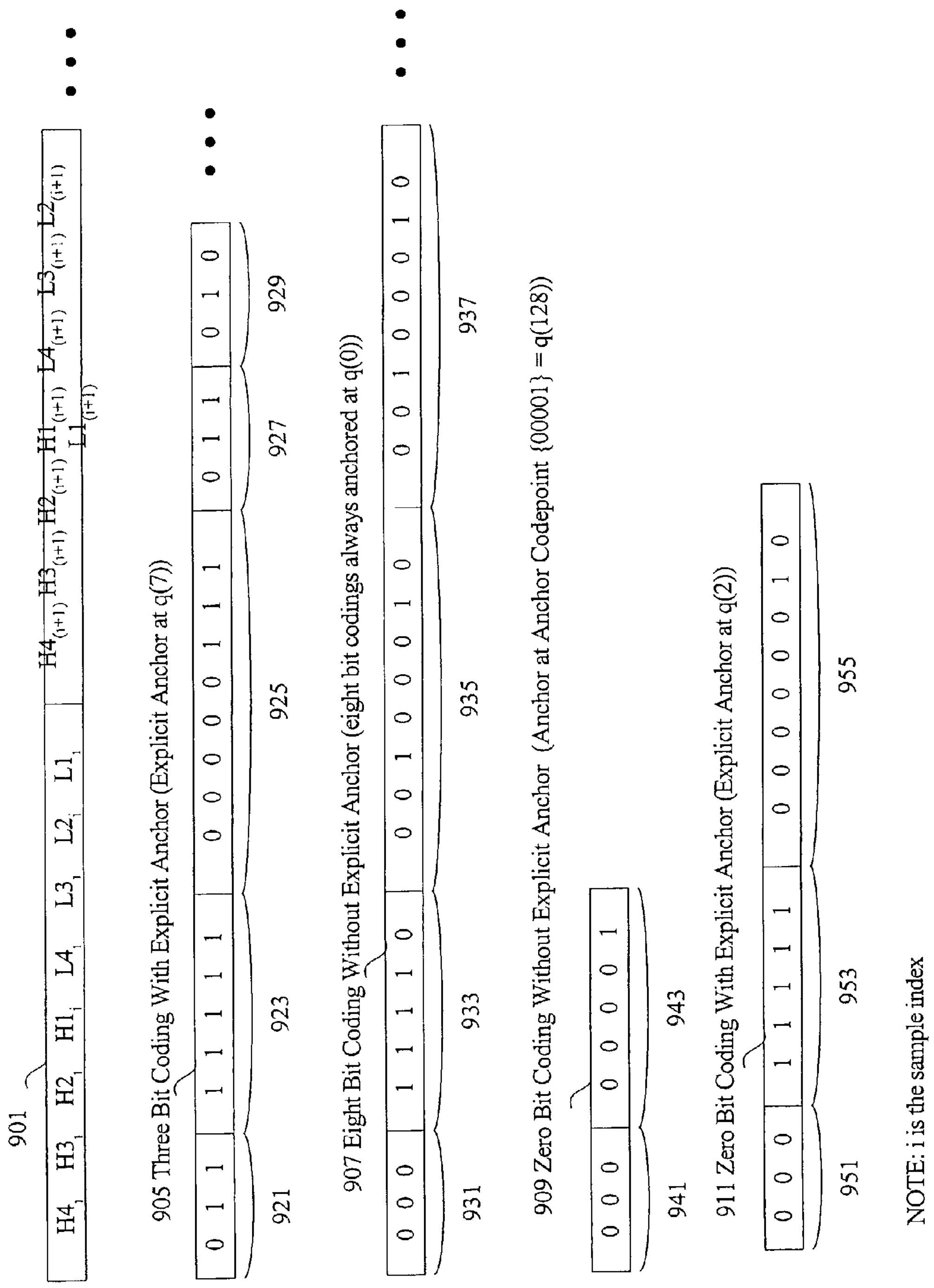
FIG. 9 is a diagrammatic representation showing a compressed delay sensitive signal using an explicit anchor.

FIG. 9 is a diagrammatic representation showing mapping using explicit anchor codepoints and non-explicit anchor situations. Frame 905 includes side information 921 and 923 indicating that an explicit anchor 925 is being used before sample data 927 and 929 is transmitted. In this frame 921 indicates a three bit encoding, 923 indicates use of an explicit anchor, and 925 specifies that explicit anchor to be at q(7). Sample data 927 and 929 therefore represent q(10) (q(7)+3) and q(9) (q(7)+2), respectively. Frame 907 includes side information 931 and 933 indicating that an eight bit encoding is being used (all eight bit encodings are anchored at q(0) and therefore 935 and 937 represent sample data as a binary count from q(0)). Frame 909 includes side information indicating that the entire frame can be represented as a single byte. The quantization level represented by A={00001} (q(128)) is the only level in the frame. Frame 911 includes side information 951 and 953 indicating a zero bit encoding with an explicit anchor at q(2); q(2) is the only level represented in the entire frame.

It should be noted that although the techniques of the present invention have been described with specific values used to indicate selected codepoints or signal an explicit anchor, the specific values may be defined differently. In another example, 30 anchors may be specified, leaving 2 values for representing special case situations. In still another example, an explicit anchor may always be used and may be transmitted as a first byte of side information instead of as a second byte. In yet another example, a first byte may include a most negative anchor and a second byte may include the most positive anchor to indicate the range of quantization levels for the frame. The actual quantization levels as well as the number of bits needed to represent each sample can then be calculated dynamically by a receiver upon knowing the algorithm used at the encoder. A variety of techniques can be used to transmit anchor information and range information.

Figure 10:
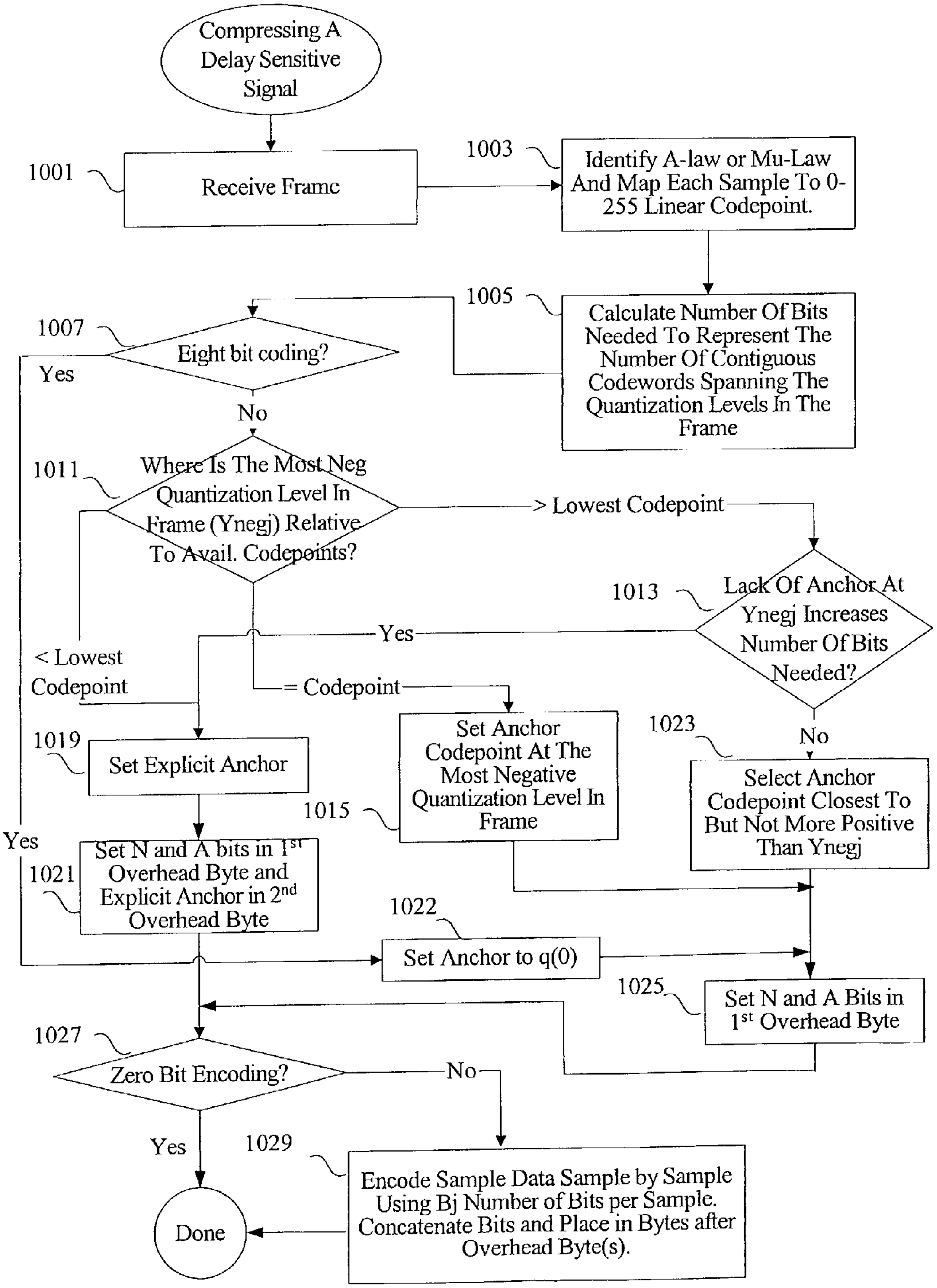
FIG. 10 is a flow process diagram showing another technique for compressing delay sensitive signal using explicit anchors.

FIG. 10 is a flow process diagram showing a technique for compressing a delay sensitive signal using the explicit anchoring technique. At 1001, a frame is received. At 1003, the A-law or mu-law quantization codepoints are mapped to the linear 0-255 codepoints. At 1005, the number of bits needed to represent the number of contiguous codewords spanning the quantization levels in the frame is determined. If it is determined at 1007 that the number of bits needed is not equal to eight, then the most negative quantization level in the frame is determined and compared to the available codepoints at 1011. It should be noted that the techniques of the present invention can be used in a variety of manners. In one case the most positive quantization level in the frame is determined and compared to the available codepoints. In still another example, the median quantization level is determined and compared to the available codepoints.

If it is determined that the most negative quantization level is less than the lowest codepoint, an explicit anchor is set at 1019 using a technique such as the one described above and the two overhead bytes required for this case are created in 1021. If it is determined that the most negative quantization level is equal to the lowest codepoint, an anchor is set at the most negative quantization level in the frame at 1015 and the one overhead byte for this case is created in 1025. If it is determined that the most negative quantization level is greater than the lowest codepoint, it is then determined if the lack of an anchor at the most negative quantization level increases the number of bits needed at 1013. If the lack of a codepoint increases the number of bits needed to represent the range of quantization levels, then an explicit anchor is used at 1019 and the two overhead bytes required for this case are created in 1021. Otherwise, a codepoint closest to but not more positive than the most negative quantization level in the frame is selected at 1023 and the one overhead byte for this case is created in 1025. If it is determined at 1007 that the number of bits needed is equal to eight, the anchor is set at q(0) by default at 1022 and the one overhead byte for this case is created in 1025.

According to various embodiments, it is determined at 1025 if zero bit encoding should be used. If zero bit encoding is being used, an anchoring codepoint is provided at 1027 along with 0 as the number of bits needed to represent the range of quantization levels in the frame. If zero bit encoding is not being used, the number of bits needed to represent the range of quantization levels in the frame is provided along with an anchoring codepoint. In typical embodiments, the codepoints are represented as simple one bit binary variations from the anchoring codepoint. In 1029 the sample data are represented by a binary count from the anchor using the number of bits determined in 1005 and are concatenated after the overhead byte(s) as per the above examples.

This invention assumes a lossless decoding and therefore a decoder function occurs at the place where the lossless mapping to the original G711 signal is desired. It is obvious to someone skilled in the art that a decoder should be able to reconstruct the original G711 bits (H4, H3, H2, H1, L4, L3, L2, L1) for each sample with knowledge of the mapping used at the encoder, the length of the frame in samples and the information contained in the side information.

The present invention for compressing signals can be implemented in a variety of communication devices. In some examples, the techniques can be implemented in a media gateway, IP phone, media terminal adapter, or generally any device that allows the transmission of telephony or audio signals such as G.711 signals onto a packet or cell based network. The communication devices may include processors, memory, as well as various input and input interfaces for transmission of data.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and formats and should not be restricted to the ones mentioned above. For example, although the frame sizes specified are set as 10 ms, 20 ms, or 30 ms in typical cases, it should be noted that varying frame sizes can be used based on the characteristics of a particular sequence of samples. In one example, frames may be split into multiple frames if using multiple frames would enhance the compression ratio of the signal. Therefore, the scope of the invention should be determined with reference to the appended claims.

What is claimed is:

1. A method, comprising:

receiving a delay sensitive signal, wherein the delay sensitive signal includes a plurality of frames each having samples at a plurality of quantization levels;

identifying a range of quantization levels associated with samples in a frame of the delay sensitive signal; and compressing the frame of the delay sensitive signal into a compressed frame, the compressed frame associated with a compressed delay sensitive signal, the compressed frame including side information having information for identifying an anchor and having information for identifying the range of variation from the anchor for the samples in the frame, wherein the compressed frame includes information to losslessly retrieve the frame in the delay sensitive signal, wherein the side information includes a first plurality of bits used to represent the number of bits needed to represent the range of quantization levels and a second plurality of bits used to represent an anchor quantization level.

2. The method of claim 1, wherein the delay sensitive signal is a companded signal.

3. The method of claim 1, wherein the compressed frame is transmitted over a packet based network.

4. The method of claim 1, wherein the delay sensitive signal represents an input analog signal compressed into logarithmic segments, wherein each logarithmic segment is quantized and coded using uniform quantization.

5. The method of claim 1, wherein the range of quantization levels is a contiguous range.

6. The method of claim 1, wherein compressing the frame of the delay sensitive signal comprises identifying an anchor quantization level.

7. The method of claim 6, wherein compressing the frame of the delay sensitive signal further comprises identifying the number of bits needed to represent each sample in the frame, wherein each sample substantially falls within the range of quantization levels associated with the frame.

8. The method of claim 7, further comprising providing the number of bits and the anchor quantization level in the compressed frame associated with the compressed delay sensitive signal.

9. The method of claim 7, wherein n is the number of bits needed to represent each sample in the frame if the range of quantization levels in the frame includes less than or equal to 2exponent(n) quantization levels.

10. The method of claim 1, wherein the delay sensitive signal is a G.711 coded PCM signal.

11. The method of claim 1, wherein the frame is approximately 10 ms to 30 ms in length.

12. The method of claim 11, wherein the frame includes approximately between 80 and 240 samples.

13. The method of claim 1, wherein the first byte of a compressed frame includes side information.

14. The method of claim 13, wherein the side information includes three bits used to represent the number of bits needed to represent the range of quantization levels and five bits are used to represent an anchor quantization level.

15. The method of claim 14, wherein 32 implicit quantization levels are available.

16. The method of claim 15, wherein 32 implicit quantization levels are spread out in a substantially logarithmic manner from the negative zero quantization level to a most negative quantization level in a range of possible quantization levels for any frame.

17. The method of claim 16, wherein an explicit anchor is used if no anchor precisely at the most negative quantization level in the range of possible quantization levels associated with the frame leads to an increase of one bit to represent each sample.

18. The method of claim 17, wherein an explicit anchor is provided using two bytes of side information.

19. The method of claim 16, further comprising a second byte of side information including an explicit quantization level.

20. A network device, comprising:

an interface configured to receiving a delay sensitive signal, wherein the delay sensitive signal includes a plurality of frames each having samples at a plurality of quantization levels;

a processor configured to identify a range of quantization levels associated with samples in a frame of the delay sensitive signal and compress the frame of the delay sensitive signal into a compressed frame, the compressed frame including side information having information for identifying an anchor and having information for identifying the range of variation from the anchor for the samples in the frame, the compressed frame associated with a compressed delay sensitive signal, wherein the compressed frame includes information to losslessly retrieve the frame in the delay sensitive signal, wherein the side information includes a first plurality of bits used to represent the number of bits needed to represent the range of quantization levels and a second plurality of bits used to represent an anchor quantization level.

21. The network device of claim 20, wherein the delay sensitive signal is a companded signal.

22. The network device of claim 20, wherein the compressed frame is transmitted over a packet based network.

23. The network device of claim 20, wherein the delay sensitive signal represents an input analog signal compressed into logarithmic segments, wherein each logarithmic segment is quantized and coded using uniform quantization.

24. The network device of claim 20, wherein the range of quantization levels is a contiguous range.

25. A computer readable medium, comprising:

computer executable instructions for receiving a delay sensitive signal, wherein the delay sensitive signal includes a plurality of frames each having samples at a plurality of quantization levels;

computer executable instructions for identifying a range of quantization levels associated with samples in a frame of the delay sensitive signal; and computer executable instructions for compressing the frame of the delay sensitive signal into a compressed frame, the compressed frame associated with a compressed delay sensitive signal, the compressed frame including side information having information for identifying an anchor and having information for identifying the range of variation from the anchor for the samples in the frame, wherein the compressed frame includes information to losslessly retrieve the frame in the delay sensitive signal, wherein the side information includes a first plurality of bits used to represent the number of bits needed to represent the range of quantization levels and a second plurality of bits used to represent an anchor quantization level.

26. The computer readable medium of claim 25, wherein the delay sensitive signal is a companded signal.

27. The computer readable medium of claim 25, wherein the compressed frame is transmitted over a packet based network.

28. The computer readable medium of claim 25, wherein the delay sensitive signal represents an input analog signal compressed into logarithmic segments, wherein each logarithmic segment is quantized and coded using uniform quantization.

29. The computer readable medium of claim 25, wherein the range of quantization levels is a contiguous range.

30. An apparatus for compressing a delay sensitive signal, the apparatus comprising:

means for receiving a delay sensitive signal, wherein the delay sensitive signal includes a plurality of frames each having samples at a plurality of quantization levels;

means for identifying a range of quantization levels associated with samples in a frame of the delay sensitive signal; and means for compressing the frame of the delay sensitive signal into a compressed frame, the compressed frame associated with a compressed delay sensitive signal, the compressed frame including side information having information for identifying an anchor and having information for identifying the range of variation from the anchor for the samples in the frame, wherein the compressed frame includes information to losslessly retrieve the frame in the delay sensitive signal, wherein the side information includes a first plurality of bits used to represent the number of bits needed to represent the range of quantization levels and a second plurality of bits used to represent an anchor quantization level.

* * * * *